US008315465B1

(12) United States Patent  (10) Patent No.: US 8,315,465 B1
Baluja et al.  (45) Date of Patent: Nov. 20, 2012

(54) EFFECTIVE FEATURE CLASSIFICATION IN IMAGES

(75) Inventors: Shumeet Baluja, Leesburg, VA (US); Michele Covell, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 409 days.

(21) Appl. No.: 12/651,128

(22) Filed: Dec. 31, 2009

Related U.S. Application Data

(60) Provisional application No. 61/143,998, filed on Jan. 12, 2009.

(51) Int. Cl.
*G06K 9/62* (2006.01)
(52) U.S. Cl. ......... 382/224; 382/156; 382/176; 382/264
(58) Field of Classification Search .................. 382/156, 382/224, 176, 264
See application file for complete search history.

(56) References Cited

OTHER PUBLICATIONS

Chen et al: "Detecting and Reading Text in Natural Scenes", Proceedings of the 2004 IEEE Computer Society Conference on Computer Vision and Pattern Recognition, 2004.*
Viola et al: "Rapid Object Detection Using a Boosted Cascade of Simple Features", Accepted Conference on Computer Vision and Pattern Recognition 2001.*
Baluja, S., Rowley, H., "Boosting Sex Identification Performance" [online] Retrieved on Apr. 26, 2010. Retrieved from: http://citeseerx.ist.psu.edu/viewdoc/download?doi=10.1.1.72.94&rep=rep1&type=pdf.
Belongie,S., Greenspan,H., Malik,J., Puzicha. (2002), "Shape matching and object recognition using shape contexts," *PAMI*, 24:509-522.
'Google Books' [online], *Wikipedia*, retrieved on Apr. 26, 2010. Retrieved from: http://en.wikipedia.org/wiki/Google_books.
Harris, C. and Stephens, M. (1988), "A Combined Corner and Edge Detector," *Proc. 4th ALVEY Vision Conference*, pp. 147-151.
Jing, Y., Baluja, S. (2008), "VisualRank: Applying PageRank to Large-Scale Image Search," *PAMI*, 30(11): 1877-1890.
Ke, Y., Sukthankar, R. (2004) "PCA-SIFT: A More Distinctive Representation for Local Image Descriptors," *CVPR*, 8 pages.
Lowe, D.G. "Distinctive Image Features from Scale Invariant Keypoints". Retrieved on Apr. 26, 2010, published on Jan. 5, 2004. Retrieved from: http://citeseerx.ist.psu.edu/viewdoc/download?doi=10.1.1.2.8899&rep=rep1&type=pdf.
Mikolajczyk, K. and Schmid, C. (2005), "A performance evaluation of local descriptors," *IEEE-PAMI*, 27(10), 16 pages.
Ruta, D. & Gabrys, B. (2000) "An Overview of Classifier Fusion Methods," *Computing and Information Systems*, vol. 7:1-10.
Suarez, A.R., Rodriguez, A.O., Sebag, M. (1999), "Automatic Graph Drawing and Stochastic Hill Climbing," *Genetic and Evo. Conf.*, 8 pages.
Viola, P. and Jones, M. "Robust real-time object detection". (2001) *Proc. IEEE Wkshp on Stati and Comp. Theories of Vision*, 2001, 25 pages.

* cited by examiner

*Primary Examiner* — Matthew Bella
*Assistant Examiner* — Ruiping Li
(74) *Attorney, Agent, or Firm* — Fish & Richardson P.C.

(57) ABSTRACT

In general, the subject matter described in this specification can be embodied in methods, systems, and program products. A plurality of electronic training images that are each classified as displaying substantially pictures is obtained. A plurality of local image features in each of the plurality of electronic training images is identified. A plurality of weak classifiers are recursively applied to the local image features. During each iteration a weak classifier that accurately classifies the local images features is selected. After each selection of a weak classifier features that were misclassified by the selected weak classifier are given greater weight than features that were classified correctly by the selected weak classifier. For each selected weak classifier a hillclimbing algorithm is performed to attempt to improve the weak classifier. A strong classifier that is a weighted combination of the selected weak classifiers on which hillclimbing algorithms have been performed is produced.

19 Claims, 8 Drawing Sheets

EFFECTIVE FEATURE CLASSIFICATION IN IMAGES

RELATED APPLICATIONS

This application claims the benefit under 35 U.S.C. §119 of U.S. Provisional Application No. 61/143,998, titled "Effective Feature Classification in Images," filed Jan. 12, 2009, which is incorporated by reference herein in its entirety.

TECHNICAL FIELD

This document relates to identification of objects such as photographs and line drawings in digital images, such as scanned pages from books.

BACKGROUND

Accurate segmentation of text and figures in images of scanned books, magazines, and newspapers helps to correctly infer the layout and flow of the primary narrative in a scanned item. In addition, once figures are accurately segmented from the surrounding text, the figures themselves can be a useful tool in representing and relating books. Pages that include images are often the most useful preview pages from books: they are faster for a person to skim than large amounts of non-illustrated text. Implicit relationships between books and documents can also be inferred by finding shared or closely related figures, and treating each as an implicit "link" from one book to another, similar to what is currently done with web documents. Being able to find the non-photo-realistic drawings, in addition to photographs, extends the number books to which such actions may be applied (e.g., historic books, manuscripts, and newsprint).

SUMMARY

This document describes systems and techniques for finding pictures and line-drawings in scanned pages. Features are first identified in an image using local-features (e.g., SIFT or CONGAS) applied to the complete scanned page. The identified features are then categorized using a discriminative classifier. In one implementation, the classifiers use a combination of multiple classifiers that have been trained using AdaBoost and a hillclimbing algorithm. Because the feature space is very large, each AdaBoost classifier is created by examining a small subset of all the weak classifiers possible, so as to improve the speed of the training process. A post-processing step may also be applied to clean up isolated errors.

Such techniques and systems may provide one or more advantages in certain implementations. For example, the techniques here may be employed in large-scale book and document scanning services, which have a wide variety of page formats and also include image artifacts such as discoloration and scan-through of items on the opposite side of a scanned page. The system can provide a balance between too many false positives and too many false negatives—between missing pictures, and spurious detection of pictures that are not there. Accurate classification permits a system to present pictures as search results to users who search across a book scanning project (and not to show text as a supposed picture result), and also to link books according to common use of an picture or pictures. Other classification and discrimination projects may also be implemented by the efficient classification mechanisms discussed here, particularly in large-scale systems having items that each have many features.

In general, one aspect of the subject matter described in this specification can be embodied in a computer-implemented classification method. A plurality of electronic training images that are each classified as displaying substantially pictures can be obtained. A plurality of local image features in each of the plurality of electronic training images can be electronically identified with a processor. A plurality of weak classifiers is recursively applied to the plurality of local image features. During each iteration a weak classifier that accurately classifies the local images features is selected. After each selection of a weak classifier features that were misclassified by the selected weak classifier are given greater weight than features that were classified correctly by the selected weak classifier. A hillclimbing algorithm is performed for each selected weak classifier in an attempt to improve the weak classifier. A strong classifier that is a weighted combination of the selected weak classifiers on which hillclimbing algorithms have been performed is produced.

In another aspect of the subject matter of the present disclosure a computer-implemented classification system includes a classification trainer to receive local feature data for electronic images, recursively apply weak classifiers to the local feature data, compare determinations made by the weak classifiers to data describing the local feature data as being picture related or text related, select, in each iteration of the recursive application of weak classifiers, a weak classifier that accurately determines that the local feature data is either picture related or text related, perform a hillclimbing operation on the selected weak classifier, and create one or more strong classifiers from the selected weak classifiers on which the hillclimbing operations were performed. The system includes a classifying module to apply the strong classifier to subsequent electronic images to identify pictures, in discrimination to text, in the one or more electronic images. The system includes persistent electronic storage that stores data that represents local image features in the subsequent electronic images that are classified by the classifying module as identifying pictures in the subsequent electronic images.

In yet another aspect of the subject matter of the present disclosure a computer-implemented image feature classification system includes a plurality of stored weak classifiers for providing an indication of whether a local image feature in an electronic image is picture-related or text-related. The system includes a plurality of documents including pre-classified features. The system includes means producing a strong classifier as a weighted composition of certain of the plurality of stored weak classifiers by combining boosting and hillclimbing operations.

These and other implementations can optionally include one or more of the following features. Classifying each of the electronic training images as displaying substantially pictures can be performed manually by a human user. The strong classifier can be trained to identify local image features in electronic images that correspond to a picture. The strong classifier can be applied to a subsequent electronic image to infer a group of local image features in the electronic image that correspond to pictures, in discrimination to local image features that correspond to text. The group of image features can be stored. Data from the group of image features can be compared to data from groups of image features for other electronic images to determine that the electronic image and one or more of the other electronic images share a common picture. A hyperlink from the electronic image to the one or more of the other electronic images can be generated. One or more of the other electronic images can be provided to a remote user device in response to a user selection of the hyperlink. Individual weak classifiers can be selected for the plurality of weak classifiers by applying an allocation mask for each individual weak classifier to local image features so that entries associated with the local image features are allocated to bins, and applying one or more comparison functions to the bins. The hillclimbing algorithm can include performing iterative attempts at improvements to a selected weak classifier and accepting an iterative attempt at improvement if the iterative attempt results in an improvement in classification, and rejecting an iterative attempt at improvement if the iterative attempt does not lead to an improvement in classification. The iterative attempts can include a modification to an allocation mask of a weak classifier. The iterative attempts can include a modification to a comparison function of a weak classifier. A plurality of strong classifiers can be produced. Features in a subsequent image can be classified according to a vote of the plurality of strong classifiers. The vote can be a majority vote of the strong classifiers or a weighted combination vote, where each strong classifier is given a weight. The strong classifier can be applied to a subsequent electronic image to infer a group of local images features in the electronic image that correspond to a picture, in discrimination to local image features that correspond to text. Local image features that have fewer than a threshold of adjacent inferred local image features within a predetermined distance can be removed subsequent to the application of the strong classifier to the electronic image.

A system can include one or more hyperlinks connecting a first image having local image features classified by the classifying module to a second image having local image features classified by the classifying module that are similar to the local image features for the first image. The creation of one or more strong classifiers can include selection of a group of the weak classifiers that includes the weak classifier from each iteration of the applying that most accurately determined if the local feature data was picture related or text related. Subsequent to each selection of a weak classifier, a subsequent round of the recursive applying can be weighted so as to give features that were misclassified by the selected weak classifier greater weight than features that were classified correctly by the selected weak classifier. The classification trainer can combine multiple strong classifiers into a meta-classifier. The classifying module can apply the meta-classifier to subsequent electronic images to identify pictures, in discrimination to text, in the one or more electronic images. The application of the meta-classifier can determine if features identified as picture-related by each strong classifier are proximate to features identified as picture-related by other of the strong classifiers in the meta-classifier to validate a portion of an image as picture related.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for discriminating between items of different types in digital images, such as discriminating between text and pictures in the images. Generally in this document, the term "digital image" is used to refer to the overall item being analyzed, such as a file or a page in a file of a scanned document (e.g., in JPEG, TIFF, or other appropriate format). The term "picture" refers to a graphical representation, such as a photograph, line drawing, graph or other pictorial representation (as opposed to mere text, though a picture can include some text, such as a legend or caption). Such a picture is often referenced in normal parlance as an "image", though we attempt to distinguish the overall item from a graphical representation in the item for clarity here, by referring to the former as an image and the latter as a picture.

The systems and techniques described here are directed to identifying pictures on a page so that the pictures can be used for a variety of purposes. As one example, pictures from different books can be compared, and matches can be identified so as to infer some level of relatedness between the documents that contain the common picture. Users of a computer system may then navigate from one such document to another, where such browsing may serve as a convenient mechanism for information finding. For example, a person using a service such as GOOGLE BOOK SEARCH may wish to study a particular historical figure such as Harriet Tubman. A limited number of photographs or drawings of such a person may exist, and may be repeated across various historical books or manuscripts. The appearance of the photograph in two of the books may serve as a clue to the relatedness of the books or manuscripts that might not be apparent from any text that surrounds the photograph, or might serve to increase the inferred relatedness of the two items. Also, such connections can be presented to a user graphically, unlike textual comparisons, so as to provide more intuitive browsing for a user through documents. As a result, more information, and more useful information, may be made available to the user.

Figure 1:
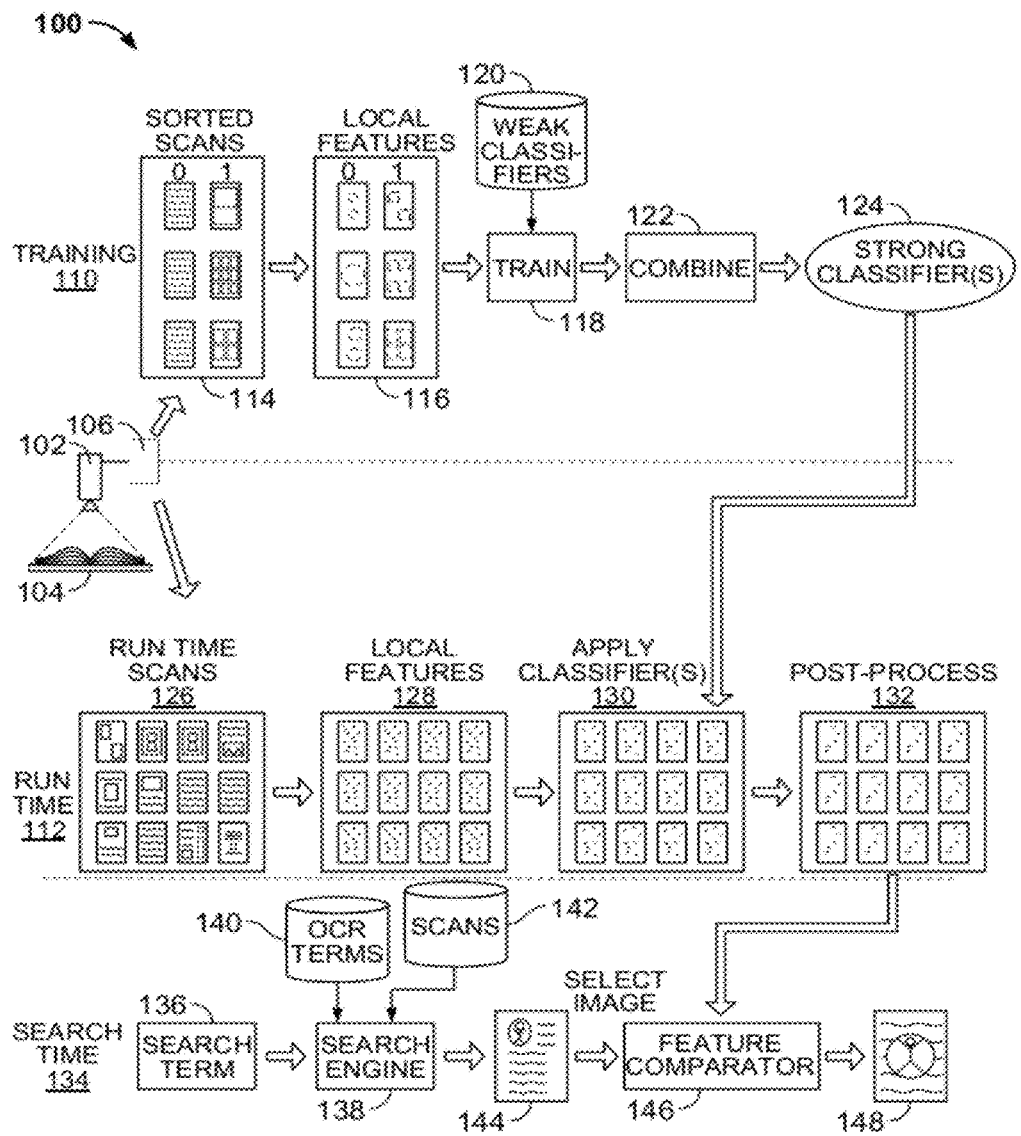
FIG. 1 is a conceptual diagram showing classification techniques for a document scanning systems.

FIG. 1 is a conceptual diagram showing classification techniques for a document scanning system 100. In general, the example system 100 is directed to identifying visual features within pictures on scanned pages from scanned documents, and to emphasizing the visual features that best discriminate any pictures on a page from text on the same page. Though the focus here is on pages because the example implementation is for a document scanning system 100, other digital images may also be employed, such as for maps, frames from video (e.g., to perform logo matching), or other such matching and discrimination processes.

The system 100 is generally depicted as having three sections, which correspond to three different phases in the use of the system 100. Referring to each section generally, the first section is a training section 110. In the training section, the system 100 is trained to distinguish pictures within scanned pages by referring to scanned pages that have previously been classified as having pictures or text, in a way that is known to be accurate (e.g., by manual classification). Such training results in one or more classifiers that are assumed to be relatively effective in identifying features on a scanned page that are associated with a picture on the page.

The second section is referred to here as a run time section 112, and corresponds to later classification of other scanned images using the classifiers developed in the first section. In particular, the classifiers are used to filter local features in an image that likely relate to a picture, from features that likely relate to text.

The third section is referred to as a search time section 134, and occurs when a user, such as a person using a book search application on the Web, is looking for information relating to a search query. The search time section 134 may initially produce search results for landing pages (such as books or other scanned documents) that contain pictures, and may then produce other results that include similar or matching pictures, where the features determined from the run time section 112 are used to determine the level of relatedness between two documents.

The system 100 may generally be implemented by a provider of web-based internet services, such as search, e-mail, and other similar services. Each of the sections may be carried out on one or more (e.g., hundreds or thousands) of computer servers, as may be appropriate to the particular task. For example, training may be scheduled on a number of servers in distributed data centers on a non-priority basis, while search queries and other interactions with end users may be prioritized and each interaction may be split across many servers to increase the speed and efficiency with which results may be supplied.

Referring more specifically to the training section 110, the process begins when a large number of pages from one or more books 104 are captured digitally by a scanner 102 and converted to a standard digital form by a processor 106. Various techniques may be used to characterize an image, including using widely available image coding mechanisms (e.g., JPEG, TIFF, etc.). The scans may be made particularly for the purpose of training the system 100 to distinguish pictures from text, or may be obtained for the system 100 from other places.

In this example, each image is manually classified into one of two groups of sorted scans 114. The first group, labeled 0 here, contains images (which are individual pages or pairs of opposed pages in this example) that contain only text. The second group, which is labeled 1 here, contains images that contain only pictures. Images that contained both pictures and text were discarded and not included in the training set. In some implementations, the second group contains images that display substantially pictures. Thus, the second group may include images that a user classified as mostly pictures with some ancillary text (e.g., text within the pictures or text in captions for the images). Images in the second group may not include text that is not included in a picture or a caption for a picture. Images in the second group may not include blocks of text or more than a pre-determined number of words (e.g., 5, 10, 20, 30, 40, or 50 words).

At the next step, the sorted scans are analyzed to identify local features in the images. Such local feature analysis can be beneficial because images often embed pictures in large amounts of text, or vice-versa, so that global image metrics such as global color histograms or global shape analysis, may provide data that is not useful for discriminating pictures on a page from text on the same page. The local feature analysis here identifies local features that are rich in terms of local information content, yet are also stable under local and global perturbations (e.g., rotation, skew, and noise). Widely known examples of such local features include Harris corners, Scale Invariant Feature Transform (SIFT), Shape Context, and others. In this example, SIFT features are used, and are discussed in more detail with respect to FIG. 3B below.

The classification process could simply stop with feature identification, and then matching or linking of images and pages could proceed by placing all of the identified descriptors into a database to infer links from the preponderance of collisions between pages, section/chapters, or books. Such a simple technique would, however, create spurious matches based on text on the pages that has been identified by the local feature identification. Moreover, the number of descriptors will grow explosively as many pages are added to a large-scale scanning project, particularly since more descriptors are generated for textual regions compared to equally sized pictorial regions, and because the majority of pages in books are devoted to text.

As a result, the system 100 includes further mechanisms for training the proper recognition of descriptors associated with pictures (which can be saved for picture identification or matching processes) compared to descriptors associated with text (which can be discarded or at least ignored for picture identification or matching processes). Such training occurs by a process for applying weak classifiers 120 to the training set and testing the suitability of each of the weak classifiers to properly classify the images in the training set as being either a textual image (labeled 0) or a pictorial image (labeled 1). This process of training (box 118) separates accurate classifiers from less accurate classifiers. The best weak classifiers are then combined (box 122) to create one or more strong classifiers (box 124) that can be used to classify future pages.

In some implementations, a strong classifier can be a set of weak classifiers with a weight associated with each weak classifier, where the weight essentially specifies how much trust is placed in each weak classifier. Multiple strong classifiers can be grouped together as a meta-classifier and applied to determine if a portion of an image is a text portion or a picture portion. In some examples, the application of the meta-classifier determines if features identified as picture-related by each strong classifier are proximate to features identified as picture-related by other of the strong classifiers in the meta-classifier. This is performed to validate a portion of an image as picture related. For example, if a first strong classifier identifies many features in a portion of an image as picture related, but another strong classifier identifies very few features in the same portion as picture related, the first strong classifier's classification may not be validated.

In simple terms, the training process can be analogized to the selection of particular rules of thumb that can be used to solve a complex problem. For example, most physicians have a number of rules of thumb that they apply in diagnosing a patient. Each rule of thumb may have greater or lesser applicability depending on the particular context in which it is applied, but generally is not enough by itself to provide an accurate assessment across a group of situations. Likewise, certain rules of thumb may be used to identify one or more image features as being or not being associated with a picture. Some of the rules of thumb may apply better in certain situations (e.g., for line drawings on clean scans) than in others (e.g., for photographs on messy or blurred scans). Where there are hundreds or thousands of such rules of thumb, analogous to weak classifiers, the process of selecting the proper rules of thumb can be extremely complex and time consuming.

Figure 3A:
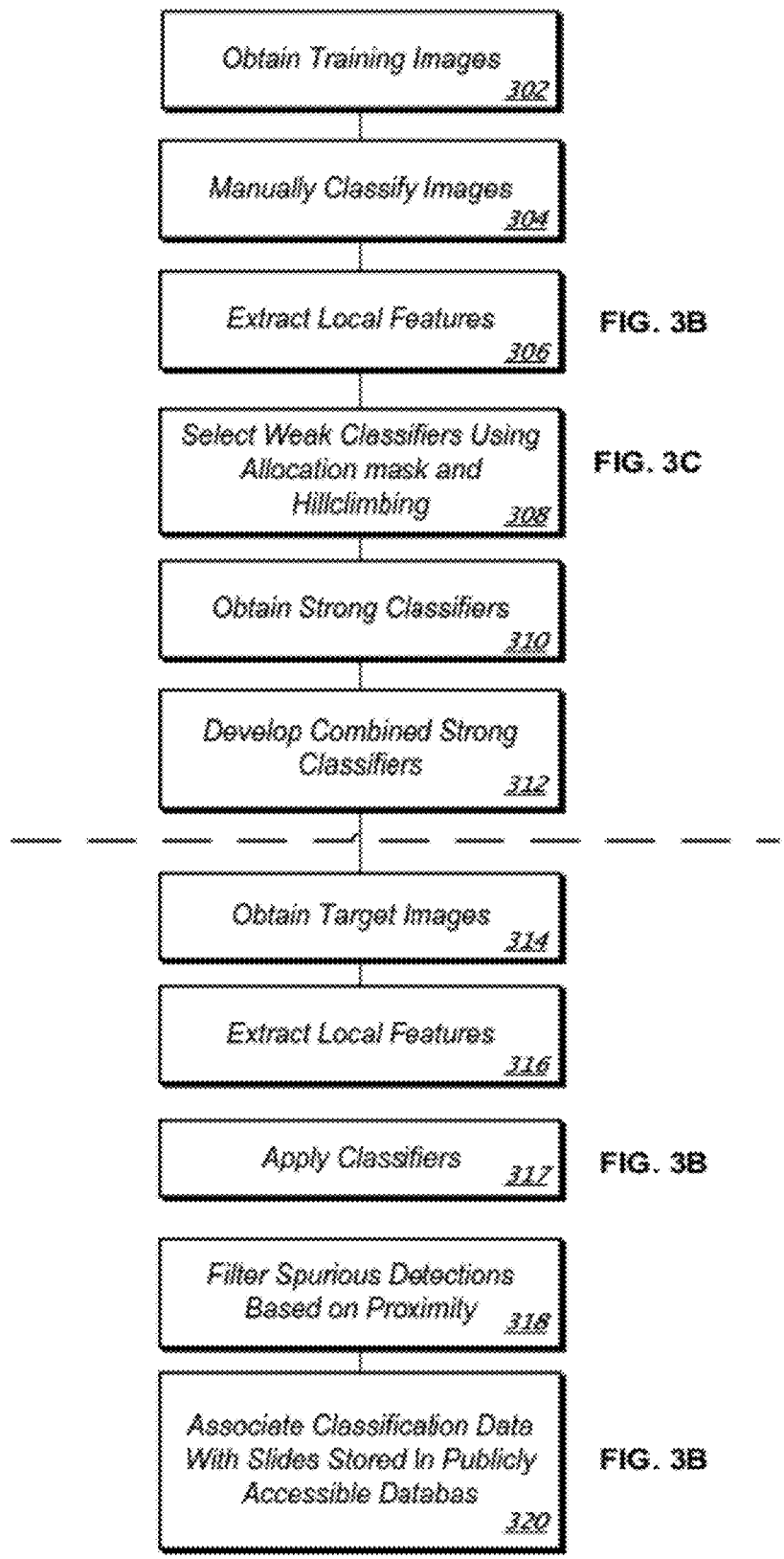
FIG. 3A is a flow chart of an example process for training and using a learning system for identifying a picture in a digital image.
Figure 3B:
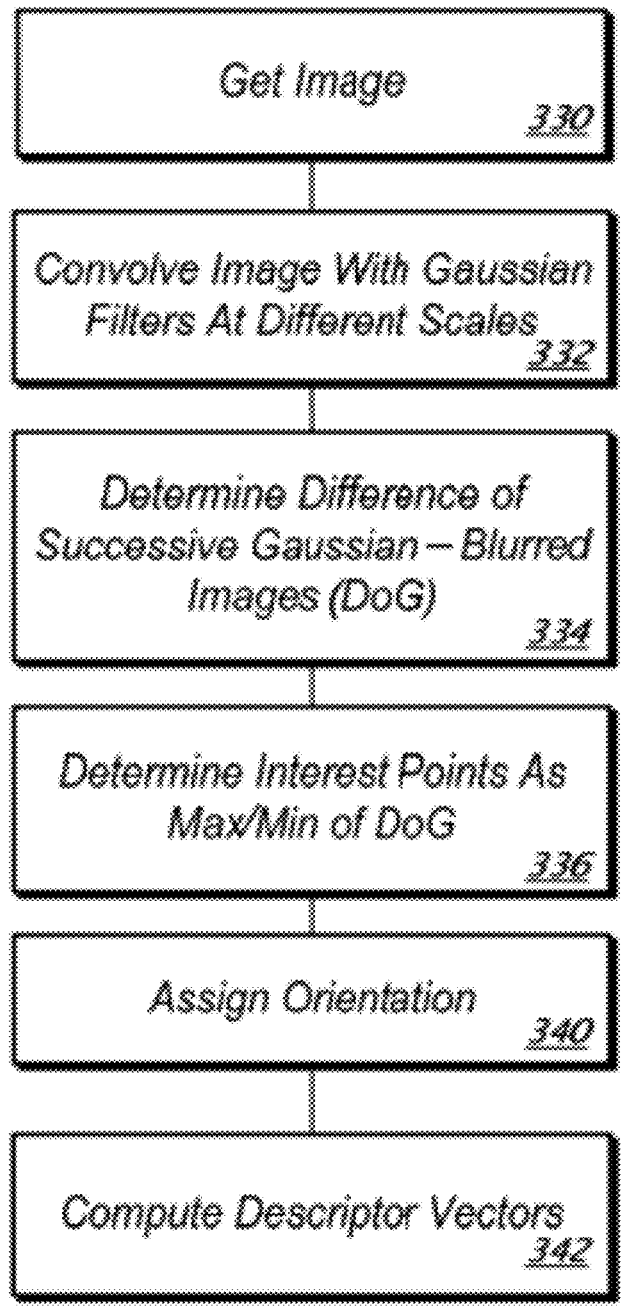
FIG. 3B is a flow chart showing an example process for identifying local features in a digital image.
Figure 3C:
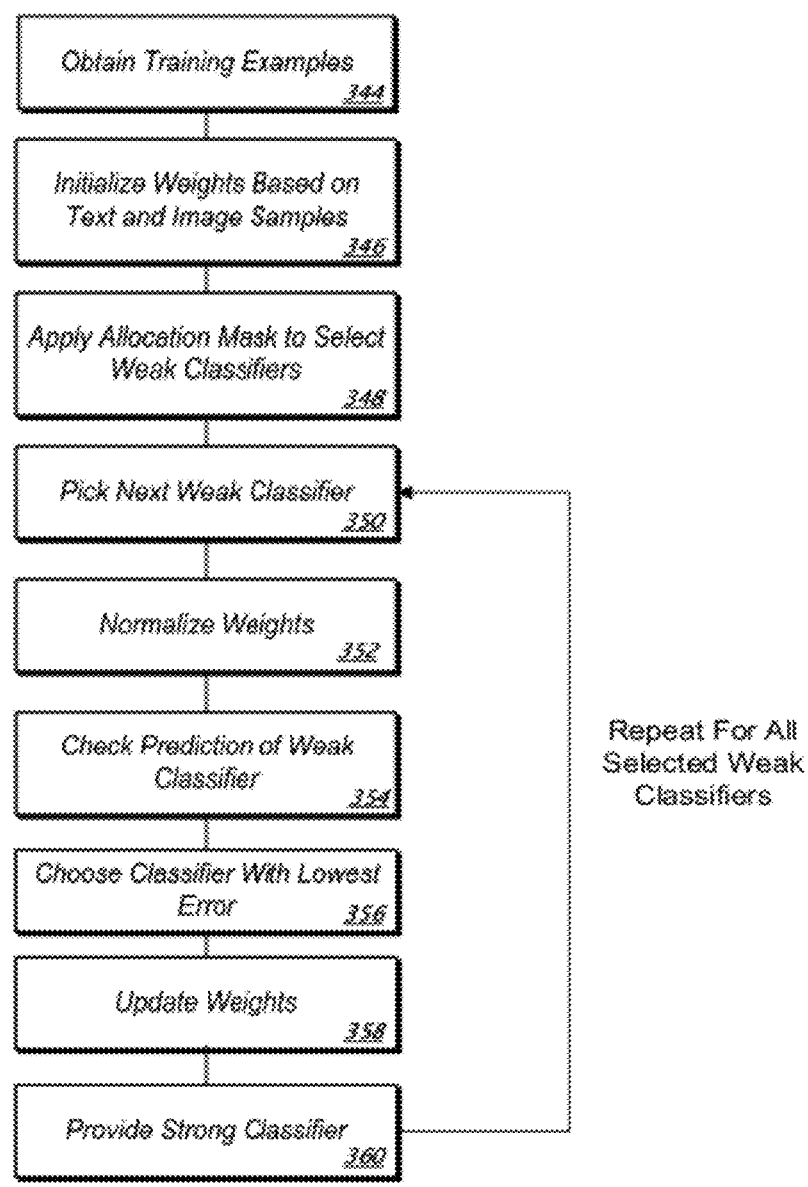
FIG. 3C is a flow chart showing an example process for identifying local features in a digital image that discriminate text from pictures.

The training process here, explained in one example in greater detail with respect to FIG. 3C, aims to identify a form of rule, as a strong classifier, that is accurate in identifying the local features from the group of local features 116, that are most likely to be associated with a picture, as opposed to text in an image. The general training or learning process used here involves boosting, and the particular example discussed below centers around the AdaBoost machine learning algorithm. The AdaBoost approach is adaptive in that it iteratively applies weak classifiers, and then selects subsequent weak classifiers in favor of instances that were misclassified by previous classifiers. In other words, the approach is a greedy learner approach that, at each step, selects the best weak classifier for the weighted errors of the previous step (where a weak classifier is one that performs at least slightly better than random), so that misclassified examples receive greater weight than correctly classified examples.

As an illustration of the applied AdaBoost algorithm, in each round of selection of a weak classifier, the examples that are misclassified have their weights increased (or alternatively, the weights of correctly classified examples are decreased), so that the new classifier focuses more on the examples that were incorrectly classified in the previous round. An example of a misclassified example is when a classifier incorrectly classifies a feature. For example, a SIFT point occurs in images where there are particular types of edges. These edges can be classified as being in a first class (normal text fonts) or a second class (line drawings). A misclassified example is when a classifier incorrectly classifies a particular SIFT point.

In summary, a boosting algorithm is used because no single weak classifier will solve the classification problem entirely. And, if we just select a bunch of weak classifiers randomly they may each solve portions of the larger problem of identifying pictures in images, but there is no guarantee that they will not all solve the same portion or that they will solve any portion well. For example, one weak classifier may effectively look for extremely thick corner edges—the type that may appear in images and not in usual text. Once this feature has been added to the strong classifier, another classifier may not be needed that looks at the same type of thick corner edge feature. Thus, the sample is reweighted as follows. The chosen weak classifier is applied to all of the images in the training set. The thick corner edges will be detected in all examples that have an extremely thick corner edge. But not all of the examples in our training set will have a thick corner edge. Therefore, additional types of weak classifiers are needed. Selection of the different types of weak classifiers is performed by weighting examples with thick corner edges lower in the next iteration because a classifier is already identified that handles this type of feature. Thus, in the next iteration, a classifier will be selected that handles the examples that the thick corner edge classifier did not handle well. This iterative procedure of reweighting takes into account the features that have been selected and biases the search for a new weak-classifier towards the examples that were not already classified very well.

The boosting procedure can be combined with a hillclimbing process. The general idea of the hillclimbing process is that once a weak classifier has been selected, an attempt can be made to improve the weak classifier. This attempt at improvement is performed by making a small change in the classifier. If the change leads to an improvement over the unchanged classifier, then the changed classifier is used as the new baseline. If the changed classifier does not work as well, one reverts back to the original classifier. In this way, the hillclimbing method can iteratively make small changes, each time improving the weak classifier a little. When the hillclimbing algorithm cannot see improvement anymore, it terminates. In this way the algorithm keeps moving "upward" to a better classifier—and does not move backwards by making any steps that make the classification worse. This procedure is not guaranteed to reach a global maximum. If stochastic hillclimbing is used, it may not even reach a local maximum. However, the process will not move away from a local maximum and the procedure is simple and computationally efficient. The hillclimbing method can be used to direct which of the potentially millions-billions of weak classifiers will be evaluated as candidates for making it into the strong classifier.

The change to the weak classifier can include changing the weak classifier's allocation mask or comparison function, to name a few examples. As an illustration, each example (a SIFT histogram of a feature) can have 128 numbers associated with the example. Each weak classifier can have an allocation mask (also of length 128) that can be applied to an example. Application of a weak classifier to an example allocates each example of the 128 numbers to a bin. As an example, the first ten entries of a particular weak classifier's allocation mask may be "A, 0, 0, 0, B, B, 0, A, A, 0." When this weak classifier is applied to an example that includes the following first ten entries, "11, 13, 15, 90, 10, 8, 22, 0, 1, 4," the weak classifier would assign 11, 0, and 1 to set A and 10 and 8 to set B. The remaining entries would remain unassigned In some implementations, next ascent stochastic hillclimbing (NA-SHC) changes the allocation mask randomly and determine if the change improves the overall classification. For example, instead of the allocation mask of "A, 0, 0, 0, B, B, 0, A, A, 0," the mask may change one allocation so that the mask now reads "A, B, 0, 0, B, B, 0, A, A, 0." The new mask would be tried, and if it worked better, the new allocation mask would replace the weak classifier with the old allocation mask.

With the system trained and one or more strong classifiers identified (box 124), the system 100 is ready to classify actual test documents in the run time section 112. In particular, scanned images of documents that have not previously been analyzed can be submitted to the system 100 for classification so as to identify what are likely to be pictures in the images of the pages. A series of image groups 126-132 are shown as an example in the run time section 112 to exemplify such a categorization process. Each group shows twelve different scanned pages from one or more documents such as books.

A first group shows run time scans 126, which are simply the scanned images as they are provided by the processor 106. A mix of page types are shown in the figure, representing pages with images of different sizes and locations, and different levels of text. A local features group 128 shows dots representing each local feature that was identified for each of the pages, such as SIFT features. Each page has many such features, covering both the textual portions of the pages and the pictorial pages of the pages. In fact, in a typical application, the textual portions may have more SIFT features than do equally sized pictorial portions. As a result, the local features group in this example does not provide a very good mechanism by which to discriminate pictures in the image from text in the image. To better make such a discrimination, the strong classified from 124 are applied to generate an applied classifiers group 130. In this example, many of the dots that represented features in the textual portions of the pages may been filtered about by the strong classifiers, though a much larger number of features associated with pictures remain. In this manner, the system 100 can begin to discriminate pictures in the image from text in the image, and also to match pictures from one image to another by comparing the feature patterns remaining in the images with feature patterns from other scanned images.

Such discrimination can be improved by applying certain post-processing actions. For example, and as explained in greater detail below with respect to FIG. 3A, a bias for the boosting to identify text at 130 may be increased, so as to make the classifiers more conservative in terms of identifying pictures over text. Such an increase may cause local classifications that truly are associated with a picture to be changed to text, but if properly selected, the change can result in classifications that better reflect text-picture distributions. A second post-processing mechanism, is to eliminate "single" detections, i.e., identified features that have no other nearby identified features. Such lonely features are likely to be spurious, and can be eliminated by identifying the number of detections within R pixels, and eliminating features that do not meet this threshold.

The run time section 112 may also be provided a parameter identifying the type of documents to be classified in the run time section 112, so as to improve the accuracy of the classification. Such improvement may be obtained by matching the parameter to a corresponding parameter for one of a number of groups of training sets that has been run through the training section 110. For example, operators in each section of the system 100 may identify certain documents (e.g., very old historical documents) as having no photographs, or as having a certain level of quality so as to characterize the number or type of imperfections on the scanned pages. Different strong classifiers may be produced by training on such subsets of a training set, and those classifiers may be used on run time scans having matching characteristics, so as to achieve better results in the system 100.

The run time scans 126 and post-processing feature data may then be stored in one or more databases and made available to a public computing service like a search engine, and more particularly a book search engine (though various other or additional corpuses are be including in the search space), at search time section 134. In addition to the processing already discussed, optical character recognition may be performed on the run time scans 126, and such extracted text may be indexed in a variety of known manners so that the text can be used as part of a search corpus.

At box 136, a search term is received from a user of the search system, such as the submission of the term "Edmund Fitzgerald" from a high school student working on a research paper about the fated ore ship from the Gordon Lightfoot song. Such a query may produce a search result for the book "Mighty Fitz: The Sinking of the Edmund Fitzgerald," by Michael Schumacher, using OCR terms 140 in a search index that is accessed by a search engine 138.

If the user selects the particular search result, images showing part or all of certain pages form the book (from scans database 142) may be shown to the user so that they can determine whether the book serves their needs, and links may be provided for the user so that they can order the book from various on-line sources. In addition, one or more selectable objects may be provided to the user so that they can search on one or more pictures in the book, such as by an outline around a picture (indicating that the picture is selectable) or a link near the image or around a page of the book displayed to the user. Selection of the picture (such as a photograph on page 144) may cause the features identified with that page (at 132) to be accessed, and other pages containing similar features to be identified by a feature comparator 146. The closest matching pages may then be returned to the user as a form of implied search result triggered by the user's selection of the object (page 148). The pages may initially be displayed as a reduced-size thumbnail, and then as complete pages if a user selects to view any such search results. The new page may also include a figure or figures, each of which may be linked to yet additional figures for navigation by a user.

In this manner, the system 100 can automatically and effectively learn the types of rules needed to distinguish features associated with pictures in an image from features associated with text in the same image. The system 100 can then be applied to scanned images so as to identify, to a certain degree, the location of pictures on the page and the content of those pictures (at least by creating what in effect is a fingerprint for that content). Such actions may then be used to match the picture across multiple images, by looking for other fingerprints that are similar. By eliminating features that are not associated with pictures in images, such as scanned pages of books and other documents, the system 100 is more efficient and effective in performing such actions.

Figure 2:
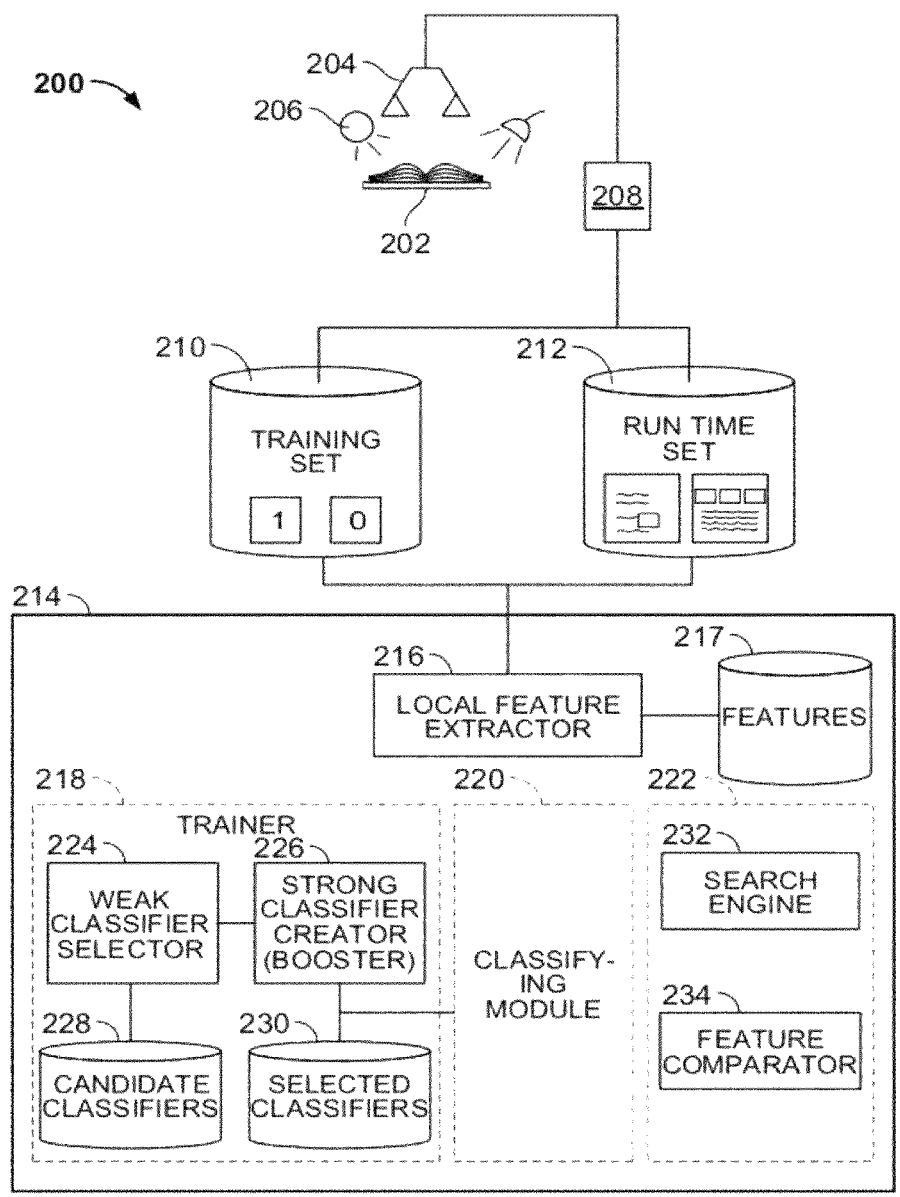
FIG. 2 is a schematic diagram of a picture classification system.

FIG. 2 is a schematic diagram of a picture classification system 200. The system 200 includes structural components for learning a classification problem, such as discriminating between pictures and text in a scanned image from documents of a certain type, and selecting appropriate classifiers for the problem. The system 200 also includes components for applying the selected classifiers to other documents so as to identify pictures in scanned images of those other documents, and for comparing features (as selected by the classifiers) between or among multiple documents, so as to infer a relationship between the documents that include common or similar pictures.

The system 200 begins at a book scanning system that is arranged to capture digital images of a large plurality of books 202. The system may include imagers 204, such as CCD cameras, and lights 206, along with mechanical page turning apparatuses, to capture digital information representing the pages in the book 202. A processor 208 receives input from the imagers 204 and encodes such information into a file format that can be used conveniently with the rest of the system 200. The images may be stored so that each image or group of images is in its own file, and the files are linked in a manner that permits them to be accessed together as a single document, or with each document corresponding to a single file that contains multiple images.

The encoded image files may be routed to various locations depending on the purpose to which they are to be put. A training set 210 of images is stored to be used in training classifiers for identifying pictures in scanned images. The training set in this example has been manually sorted into images that include only text and images that include only pictures (or images that include substantially pictures with perhaps some ancillary text as part of the pictures or as captions for the pictures). The training set is thus binary with respect to the factor under consideration, thus making the classification training easier. However, other sorts of training sets could also be employed. A run time set 212 includes images that are to be classified, i.e., the images on which the system is to work. The run time set in this example includes images that have only text, images that have only pictures, and many images that have widely varying combinations of text and pictures. Generally, the run time set can include pages from a large-scale book scanning project, where users can search for content in books, and have links between the books that are based on matches between pictures in different books. The pictures in this example could also be, for example, faces in video images, where the matching is to occur so as to identify the same person in images from different contexts.

A document search system 214 may be used to provide users of the system 214 with access to images of the scanned books 202. The search system 214 includes three main sub-systems, which may each be implemented on separate server systems in a real-world implementation, but are shown together schematically here for greater clarity. The sub-system include a trainer 218 for training classifiers for discriminating pictures from text in images, a classifying module 220 for applying the classifiers to actual images, and a search module 222 for providing relevant images for review by users of the system 214.

The subsystems 218-222 are served by a local feature extractor 216. The extractor 216 is provided to tag image features in the training set 210 and the run time set 212 according to a predetermined process, such as by identifying SIFT features and saving those features in association with the images (where each feature is identified in association with a location on a respective image and includes information describing the feature). The particular feature data may be saved in a features database 217 in a manner that correlates each feature to its base image so that the features can be used to identify items in an image.

The trainer 218 sub-system may use the features from the training set 210 to develop one or more strong classifiers for documents of the type stored in the training set 210 and the run time set 212. The trainer includes a large number of previously identified weak classifiers 228 that can serve as rules of thumb for separating features that represent a picture in an image from features that represent text. A weak classifier selector 224 selects candidate classifiers for consideration in classifying the images. The weak classifier selector, for example, may implement portions of the AdaBoost process for boosting selections by selecting appropriate weak classifiers to build one or more strong classifiers. The weak classifier, for example, may be provided with an allocation mask that can be randomly changed in a hillclimbing process to identify weak classifiers that perform a more accurate classification. The particular selection technique, in this example, is described more fully with respect to FIGS. 3A and 3C below.

A strong classifier creator 226, or booster, is configured to further select which of the initially selected weak classifiers to use, and the weights to be provided to each weak classifier, in developing a strong classifier or group of strong classifiers. The strong classifier creator 226 may operate using a form of the AdaBoost process, and may store the selected strong classifiers in selected classifier storage 230. The strong classifiers may be stored with additional rules that may help discriminate pictures from text in an image. One example rule may include a heuristic for eliminating stray features (features that do not have many other features around them) in an image. Stray features may have been classified as picture features, but may not actually be picture features. The stray features may be determined to be false matches because usually picture features occur in clumps. Thus, if a feature is stray, it may likely be a false match and may be removed from the analysis.

The second sub-system, the classifying module 220, applies the selected strong classifier or classifiers to images in the run time set 212, so as to provide discrimination between pictures and text in images from the run time set 212. Such application of the classifiers and other rules may be relatively straightforward, and may result in the features for each image that were generated by the local feature extractor 216 being reduced, so that, for the most part, only features that the strong classifier classified as belonging to a picture remain. The effectiveness of the classifying module may be adjusted by changing a threshold for deciding that a feature is picture-related or text-related, so as to better control whether to bias the system toward over-inclusion of features or under-inclusion of features. The output of the classifying module 220 may include feature data that is a subset of the original feature data created by the local feature extractor 216, where the remaining subset is biased heavily toward areas in images associated with pictures in the images.

The classifying module may also be accompanied by other components that act on the run time set 212. For example, an optical character recognition module (not shown) may be provided to create a textual representation of the image text on pages. The optical character recognition (OCR) module may be "tuned" by the classified feature data so as to focus its efforts on areas of an image that have been identified as containing text rather than pictures. As a result, the optical character recognition module can operate more efficiently, and also better connect text in series, as it was intended by its author to be taken. Additionally, the OCR module can be used to provide extra evidence to the described picture recognition system. As an example, if an area of the image is labeled as text, but the OCR module finds no text in the area, that area may not actually be a text portion of the image. In response, the portion of the image may be classified as a picture instead of text. In some examples, the reclassification may occur only if the portion of the image was weakly identified as text as the information from the OCR module pushes the weak weighting back over towards classification as an picture.

The search sub-system 222, which almost certainly would be implemented separately from the other sub-systems, provides common search capabilities to users of the system 214. In particular, a search engine 232 may receive search queries and may compare the search queries to one or more indexes of documents, including an index representing the text created by the optical character recognition module. Particular text searching mechanisms are well described in the art, and any appropriate mechanism may be used here. The search engine 232 may cause a series of search results to be returned to a user, such as in the form of a list of textual snippets from documents that address the search query, or a series of pictures from the documents. Provision of pictures may have an advantage, in that humans may more readily comprehend such graphical information, and, as in common parlance, a picture is worth a thousand words.

A user may select a search result, such as a scanned book or other document, and may be presented with images of pages from the document, such as images from run time set 212. In appropriate circumstances, the user may browse through the document to determine whether it includes information relevant to their needs. The user's browsing may indicate to them that they should look at other sources—much as happens in any research project. Various mechanisms may be provided to take the user to related documents. For example, comparisons of recognized text may be used to identify related documents, and a hyperlink or links may be provided to the user to navigate to those other documents. Also, pictures may be hyperlinked so as to take the user to other documents or books with the same image or images.

A feature comparator 234 may be used to generate targets for such picture-based hyperlinks. The feature comparator identifies relationships between features in one image and features in another, particularly features that have been filtered so as to represent, for the most part, only pictures in images. The comparator 234 may operate according to various processes, though most will consider the number and type of features and their relative positioning with respect to each other—such as clustering and spacing.

In this manner, a user of a search system can find search results in scanned documents quickly, and can then conveniently find other documents, not only by textual similarity between documents, but also by pictorial similarity.

FIG. 3A is a flow chart of an example process for training and using a learning system for identifying a picture in a digital image. In general, the process shows a process of training a system to select classifiers for selecting picture-related local features in an image, followed by applying those classifiers to select actual local features in a variety of images. Such a process can be used to help identify the location and general content of such pictures, so that pictures from one image may be compared to pictures from another in an efficient and effective manner.

The process begins at box 302 where training images are obtained. The images may come from a variety of sources, such as from books that have previously been scanned for a book search service. Preferably, the training images are similar to the images to be classified. The training images may be filtered or classified, in that only images that have all or substantially all text, and images having all or substantially all pictures, are used (box 304). Such filtering may occur manually by user classification of the images into one of three bins—text, picture, or eliminate.

At box 306, local features are extracted from, or identified in, the images. Such identification of local features may use a variety of different mechanisms, such as SIFT. Details of SIFT feature identification are provided in the example process described with respect to FIG. 3B below.

With the features identified in the training images, particular classifiers that are good at distinguishing pictures from text may be determined, by testing classifiers against the already-known (and presumably accurate) manual classifications for the training set. Such a process may include an iterative selection of and application of weak classifiers, where classifiers are selected using an allocation mask and hill climbing mechanism that is described in more detail with respect to FIG. 3C (box 308). The process of identifying and selecting weak classifiers may result in the identification of one or more strong classifiers that apply a combination of the best weak classifiers (box 310). Also, multiple strong classifiers may be combined, as described in more detail below, to provide even better results in certain implementations (box 312).

The actions discussed to this point in FIG. 3A are directed to training classifiers for distinguishing pictures from text in digital images of scanned documents. The remaining actions relate to the use of such classifiers to classify other images that are received by a system, referred to here as "target images." At box 314, such target images are obtained. The images may, like the training images, be obtained as part of a document scanning program, and may be from the same collection as, or a different collection than, the training images. For example, a document scanning project may be ongoing, and scanned images may be procured on a relatively continuous basis, where the classification described here is part of the processing process to which the scanned images are subjected before being made available to the public. Other such processes may include clean-up, such as removing page lines from around the edge of a scanned page, and optical character recognition to obtain a textual version of the graphical text on a scanned page. The obtained data may be associated with the page by the system, so that the data can be used to identify the page, and then the image can be retrieved for review by a user of such a system.

At box 316, local features are extracted from the target images, with the features from each scanned image being specifically associated with that image, and stored in a manner that permits identification of the location of the feature on the image. The feature extraction process may match the process used at box 306 to extract local features from the training images (e.g. SIFT).

At box 317, the classifiers determined earlier in the process are applied to the extracted features. Such classifiers may generate an indication, such as a score, to provide an inference regarding whether certain of the extracted features are likely to be features associated with an picture or features associated with text. Such an indication may be used to eliminate the features identified as being associated with text. The threshold between distinguishing a feature as picture-related or text-related may be adjusted (either manually by an operator observing the output of the system, or automatically by the system itself) to shift the bias toward classifying features, so as to better balance the proportion of false positives or false negatives. By tuning the threshold and allowing some SIFT features to be missed, the number of false-positives can be reduced dramatically. Empirically testing found that setting the threshold to 59% for the types of book scans described herein (9% above the standard setting of 50%), was enough to make a noticeable difference.

The classification step may result in certain text-related features remaining in an image for various reasons. However, if such features stand alone in the image, without other similar features around them, they can be determined to be likely text-related, because pictures are relative large and generate a number of different spatially coherent features that should survive the classification process. As a result, such false-positives may be eliminated by requiring at least D detections within R pixels for final image detection, with, for example, D=3 and R=4% of the page width (box 318).

Finally, at box 320, the features, or classification data, are saved in a manner so that they can be processed and correlated to their associated images. Such storage of the classification data for each image, or at least each image determined to contain pictures, may permit comparisons to be made between the data for different pages so as to determine whether two different pages might display the same or similar images. Such information may be used to generate links between pages, and users of a system may select such links to navigate from one page to the related page. In this manner, the process just described can provide an additional, powerful web of connections between and among internet-accessible documents to which the public may desire access.

FIG. 3B is a flow chart showing an example process for identifying local features in a digital image. The particular process shown here is a form of scale-invariant feature transform, a process commonly used to detect and describe local features in images. As an initial step (box 330), the process obtains an image in which features are to be identified. The features may involve various sorts of visual components such as changes in pixel colors across an area, indicating that the image is changing from no item (background color) to an item that is part of the image (object color, such as black). The process first convolves the image with Gaussian filters at different scales to build a pyramid of scaled images. The filters are iteratively applied to the original image in this manner. For example, the image may be broken into pieces of different sizes and the filters applied to each piece of the image at those different sizes or levels of granularity (box 332). The process may fire on all portions of the image, including portions that include pictures and portions that include text.

The process then determines a difference of Gaussian (DoG) for successive Gaussian-blurred images (box 334).

The characteristic scale and interest points can be estimated from the DoG images by determining the maxima and minima of the difference of Gaussian determinations over the scale space (box 336). Given the DoG pyramid, interest points are selected that are located at the local extrema of 2D image space and scale space to localize the points. With the keypoints localized, an orientation may be assigned to the interest points (box 340). The orientation helps to eliminate variation between images that is introduced by rotational irregularities, such as when a paper page was crooked in a digital scanner. A gradient map may be computed for a region around an interest point and then divided into a collection of subregions in which an orientation histogram can be computed.

Finally, at box 342, the process computes descriptor vectors for the features. The vectors may be 128-dimension vectors formed by concatenating 4×4 orientation histograms with 8 bins (representing the gradient directions). The histograms may then be used by other processes, such as that described next in FIG. 3C, to determine which histograms (i.e., features) represent text and which represent pictures.

FIG. 3C is a flow chart showing an example process for identifying local features in a digital image that discriminate text from pictures. The particular process shown here is a form of AdaBoost boosting. Boosting generally describes a family of machine learning algorithms that can improve the accuracy of a learning algorithm, techniques that are well known in the art. AdaBoost boosting takes as an input a training set that belongs to a domain space, where each member of the training set in the space is associated with a label from a label set. In this example, the member of the set is a feature from an image, while the label indicates whether the feature came from an all-text training page or an all-pictures training page. AdaBoost looks to weak classifiers candidates and tests those classifiers against the training set to identify effective strong classifiers (which can be a weighted sum of the weak classifiers, where the weights are chosen based on errors found as part of the recursive weak classifier selection process) that will work well with similar types of images. AdaBoost is a greedy learner that, at each step of a recursive process of testing weak classifiers, selects the best weak classifier for the weighted errors of the previous step (where a weak classifier performs at least slightly better than random). The weight changes applied to the training examples are such that misclassified examples receive a greater weight than properly classified examples so that in the next iteration the remaining errors can be addressed.

The boosting process begins at box 344, where the training examples are obtained. The examples may simply be the output of the SIFT process described in FIG. 3B. The samples may be expressed in the form $(x_1, y_1) \ldots (x_n, y_n)$, where $X_s$ are the SIFT features, and $y_i=0$ for those that can from text-only pages and $y_i=1$ for those that came from picture-only pages. At box 346, the weights for classifiers are set to an initial mount that is proportionate to the number of samples from each of the text-only and picture-only pages, respectively. In particular, weights may be assigned as $w_{T,s}=0.5/T$, $0.5/I$ for $y_s=0,1$ respectively, where T and I are the number of text and image SIFT samples, respectively.

One important decision is the appropriate weak classifiers to use, as there can be an extremely large number of candidate weak classifiers, some of which may be very helpful in a particular situation and some of which may not be helpful at all. Each weak classifier may look at 128 values (the SIFT histogram), identify two sets of numbers based on an allocation mask, and perform a basic operation on each set of numbers. In this example, an allocation mask is applied to each of the 128 entries in the SIFT histograms (box 348). The mask allocates each entry in a SIFT histogram to either bin A or bin B or leaves it unallocated. A number of comparison functions can be used to compare bin A to bin B, such as the absolute or percent difference between bin A and bin B, the ratio of bin A to bin B, the ratio of the averages of bin A and bin B, and other such comparison. Once the two sets of numbers have been identified, they are compared with comparison functions (operations to compare the groups of numbers). As described above, there are many mechanisms to compare the sets. For example, the first set can be averaged, the second set can be averaged, and the ratio between the sets may then be determined. Finally, if the image has a ratio above a threshold, the example may be identified as associated with a picture. If the image has a ratio below the threshold (or a different threshold), the example may be identified as associated with text. The comparison functions specify what is done with the two sets of examples. The comparison functions may be very simple because they need to be fast.

The described procedure can be repeated many times with classifiers that are modified slightly every time (e.g., as an implementation of a hillclimbing method). Example modifications can include: (1) changing the allocation mask so that the 128 values are assigned to different sets, (2) changing the type of operation performed on the sets of numbers (e.g., average, sum, max, etc.), and (3) a different comparison function (e.g., subtraction instead of ratio). After many iterations of such changes, the weak classifier that works the best at separating the two classes can be selected to be included as part of the strong classifier.

Once the allocation mask and the comparison function are chosen, each weighted training example is run through a weighted weak classifier in a loop. A threshold is automatically computed that maximizes the weighted correct response, so that each classifier is a tuple of {allocation-mask, comparison-function, threshold}.

The looping process begins at box 350, where a weak classifier is selected. The weights ($w_{m,s}$) for the weak classifier may be normalized such that the sum of all $w_{m,s}$ across all I is 1.0 (box 352). The prediction of the weak classifier ($C_j$, $0<=j<J$)) is then checked (box 354). To do so, the error with respect to the weights is measured by $error_m=Sum(i)\ w_{m,s}|C_j(x_s)-Y_s|$. The weak classifier (denoted Cm) with the lowest $error_m$ is then chosen.

Then the weights are updated (box 358). If the example is classified incorrectly: $w_m+1,_s=w_{m,s}$. Otherwise, wm+1, s=$w_{m,s} B_m$. The process then repeats upon selection of a weak classifier, and a strong classifier is formed from the weighted selected weak classifiers (box 360).

In this particular example, 7500 weak classifiers were evaluated (J=7500), and a total of 150 weak classifiers were chosen (M=150). In each of 150 iterations, 7500 weak classifiers were evaluated and the first classifier was chosen randomly. The chosen classifier was modified and re-evaluated in a hillclimbing process. If the classifier worked better, it was kept. Otherwise the classifier was discarded.

To improve the performance of the process, the allocation mask and the comparison function can use a process such as next-ascent stochastic hillclimbing (NA-SHC) to select the weak classifiers to evaluate. With NA-SHC, the search is initialized with a random allocation mask and comparison function. Then, in each iteration, a random perturbation of the current individual is considered (for example, changing the comparison function or the allocation of a bin in the histogram). The new candidate is evaluated and compared to the old one. If the new candidate is better than the old solution (or at least equal), the new solution replaces the old one. In this approach or a random approach, 7500 weak classifiers are evaluated per iteration.

In one example, to evaluate the learning procedures just discussed, scanned pages from hundreds of books were considered. For the training samples, pages that contained pure text were placed into class 1, and pages that contained only images (other than perhaps captions) were placed in class 2. The SIFT features from these pages were computed and used for training with AdaBoost. To test the resultant strong classifiers, a similar procedure (with pages gathered from multiple books that were outside the initial training-set) was used for testing.

A total of 8-million SIFT features (4 million from each class) were used for training. The strong-classifiers trained with AdaBoost employed a total of 150 weak classifiers. 7,500 weak-classifiers were evaluated in each iteration before the best found weak-classifier was added to the strong-classifier. For testing, separate test sets were created with a total of 600,000 SIFT features. The results are shown in the table below:

TABLE 1

Results on large test sets

|  | Single Classifier | Multiple Strong Classifiers | |
|---|---|---|---|
|  |  | 3 classifiers | 5 classifiers |
| Random Exploration | 83.1% | 85.8% | 86.6% |
| Hillclimbing NA-SHC | 86.2% | 89.1% | 90.0% |

The table compares the percentage of correct classifications for random exploration and for hillclimbing to select classifiers. Also, figures are provided to compare accuracy from the use of a single classifier to accuracy from the use of multiple classifiers. Because many errors appear to be random, a group-of-classifiers approach with a suite of strong classifiers may be used to reduce the overall error level. In such an approach, each SIFT-vector is classified by a group of classifiers. Although there are numerous methods to combine classifiers, the method chosen here involves each classifier casting a vote (picture or text) for each SIFT-vector. The final classification can be the simple majority. In some implementations, the final classification is based on a weighted combination—where each strong classifier is given a weight—for example, based on how well it has done on the training set (some strong classifiers will do better than others). The table above thus shows the improvement in accuracy for the example when using multiple strong classifiers.

Figure 4:
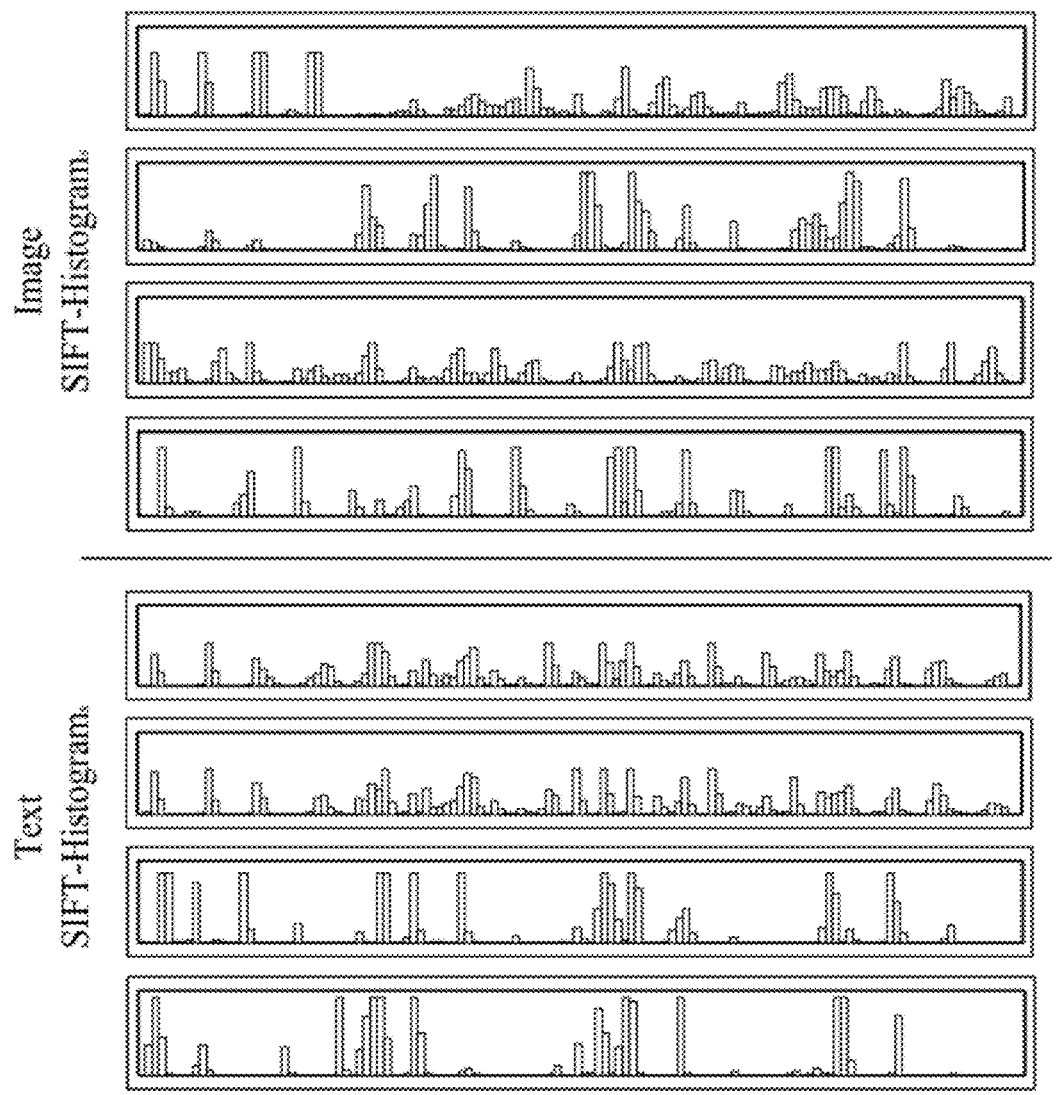
FIG. 4 shows two example histograms representing features in a digital image.

FIG. 4 shows two example histograms representing features in a digital image. The histograms represent SIFT features as a 128-dimensional vector—by concatenating 4×4 orientation histograms with 8 bins (representing gradient directions). The top four rows show histogram vectors taken from pages that have line drawings, while the bottom four rows show histogram vectors taken from pages that have only text. The task as explained above is to determine which histograms, or features, represent text and which represent pictures.

Figure 5:
FIG. 5 shows local features in multiple scanned pages at various stages of processing.

FIG. 5 shows local features in multiple scanned pages at various stages of processing. Five different pages are shown to provide various examples of the operation of a classification system to identify pictures in an image. The first row shows a page having a combination of three pictures interweaved with text. The second page has no pictures, but does include equations and discoloration that can easily be mistaken for pictures. The third row has a page showing three line drawings of a skull in a row, with a two-column table of text below the pictures. The fourth row has a page completely of text, but has a square faded or discolored area at its left side. The fifth row shows a page with a single image, and text in a variety of fonts and font sizes, where larger fonts could easily be mistaken for a picture.

The first column, column A, shows the scanned digital images for each page, before any discrimination operations have been performed on them. The second column, column B, shows indicators for local features overlaid on the images. As can be seen, there are numerous local features on all of the pages, and the most where there is text. As a result, the mass of local features does not provide much information distinguishing pictures from text, and is also a lot of data to handle, particularly if millions of pages are to be tracked and compared.

In the third column, column C, the local features have been run through the classifiers created by the AdaBoost procedure discussed above. As can be seen, much discrimination has already occurred between text and pictures. For example, the fourth row—a page of all text—has almost no remaining features. The second row—text and formulae—has more features (likely because equations look somewhat like line drawings), but most have been removed. In contrast, in the remaining rows, a large number of features remain over each of the pictures, and very few remain over the text.

The fourth column—column D—shows further removal of features over the text (and some over the pictures) using multiple classifiers, as discussed above. Thus, for example, most of the features over the page in the second row have now been removed. At column E, the post-processing described above (affecting the threshold for triggering a discrimination and removing isolated "single" detections) has been applied, which has removed all of the features that had no other features in their vicinity. The column shows very good correlation between the remaining features and the true pictures in each of the images.

Column F shows the identification of images using a current classification system for GOOGLE BOOK SEARCH (GBCS). In the first row, GBS found two photos but missed a line drawing, whereas the current system found the two photographs and has a fair number of local features at the line drawing. In the second row, GBS classified the entire image as a picture, whereas the current systems successfully remove all or almost all of the original features. In the third row, GBS identified one line drawing, but missed two other line drawings. The current systems identified the middle drawing very well, and also identified the other drawings fairly well. In row four, GBS was tricked by the square discoloration into thinking that a picture was shown there, whereas the current system placed no or almost no features there. Finally, the last row shows GBS finding the one image and the current systems also identifying the image well.

Figure 6:
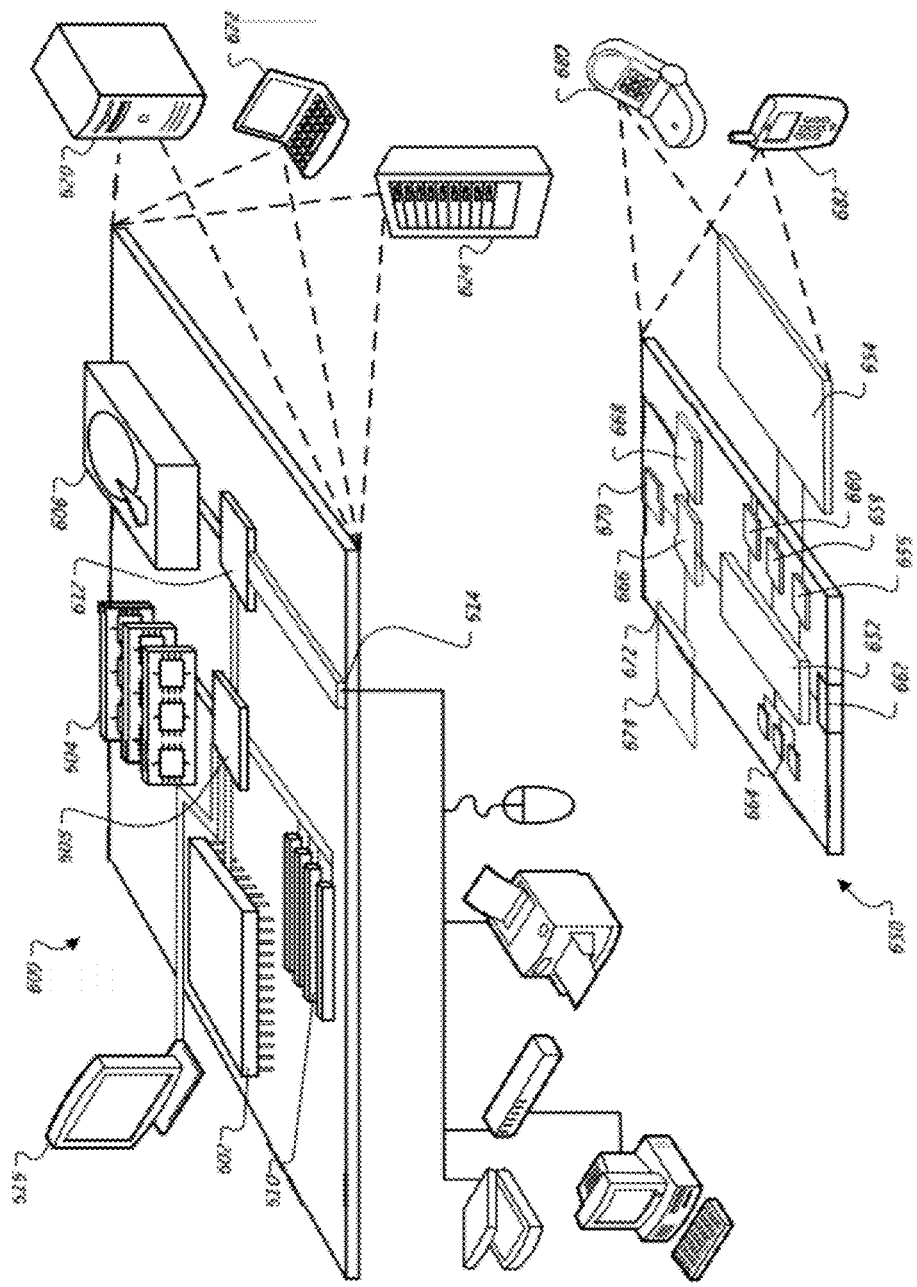
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to scanned images from books and other similar documents. However, the features discussed here may also be applicable to other applications in which the number of possible features and combinations of features on which a classifier might operate is extremely large, such as other image and video classification problems.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented classification method, comprising:
   obtaining a plurality of electronic training images that are each classified as displaying substantially pictures;
   electronically identifying with a processor a plurality of local image features in each of the plurality of electronic training images;
   recursively applying a plurality of weak classifiers to the plurality of local image features, wherein during each iteration a weak classifier that accurately classifies the local image features is selected, wherein after each selection of a weak classifier features that were misclassified by the selected weak classifier are given greater weight than features that were classified correctly by the selected weak classifier;
   performing for each selected weak classifier a hillclimbing algorithm to attempt to improve the weak classifier;
   producing a strong classifier that is a weighted combination of the selected weak classifiers on which hillclimbing algorithms have been performed; and
   producing a plurality of strong classifiers, and classifying features in a subsequent image according to a vote of the plurality of strong classifiers, wherein the vote is a majority vote of the strong classifiers or a weighted combination vote, where each strong classifier is given a weight.

2. The method of claim 1, further comprising manually by a human user classifying each of the electronic training images as displaying substantially pictures.

3. The method of claim 2, wherein the strong classifier is trained to identify local image features in electronic images that correspond to a picture.

4. The method of claim 3, further comprising applying the strong classifier to a subsequent electronic image to infer a group of local image features in the electronic image that correspond to pictures, in discrimination to local image features that correspond to text.

5. A computer-implemented classification method, comprising:
manually by a human user classifying each of a plurality of electronic training images as displaying substantially pictures;
obtaining the plurality of electronic training images that are each classified as displaying substantially pictures;
electronically identifying with a processor a plurality of local image features in each of the plurality of electronic training images;
recursively applying a plurality of weak classifiers to the plurality of local image features, wherein during each iteration a weak classifier that accurately classifies the local image features is selected, wherein after each selection of a weak classifier features that were misclassified by the selected weak classifier are given greater weight than features that were classified correctly by the selected weak classifier;
performing for each selected weak classifier a hillclimbing algorithm to attempt to improve the weak classifier;
producing a strong classifier that is a weighted combination of the selected weak classifiers on which hillclimbing algorithms have been performed, wherein the strong classifier is trained to identify local image features in electronic images that correspond to a picture;
applying the strong classifier to a subsequent electronic image to infer a group of local image features in the electronic image that correspond to pictures, in discrimination to local image features that correspond to text; and
storing the group of image features, and comparing data from the group of image features to data from groups of image features for other electronic images to determine that the electronic image and one or more of the other electronic images share a common picture.

6. The method of claim 5, further comprising generating a hyperlink from the electronic image to the one or more of the other electronic images, and providing the one or more of the other electronic images to a remote user device in response to a user selection of the hyperlink.

7. The method of claim 1, further comprising selecting individual weak classifiers for the plurality of weak classifiers by applying an allocation mask for each individual weak classifier to local image features so that entries associated with the local image features are allocated to bins, and applying one or more comparison functions to the bins.

8. The method of claim 7, wherein the hillclimbing algorithm includes performing iterative attempts at improvements to a selected weak classifier and accepting an iterative attempt at improvement if the iterative attempt results in an improvement in classification, and rejecting an iterative attempt at improvement if the iterative attempt does not lead to an improvement in classification.

9. The method of claim 8, wherein the iterative attempts include a modification to an allocation mask of a weak classifier.

10. A computer-implemented classification method, comprising:
obtaining a plurality of electronic training images that are each classified as displaying substantially pictures;
electronically identifying with a processor a plurality of local image features in each of the plurality of electronic training images;
recursively applying a plurality of weak classifiers to the plurality of local image features, wherein during each iteration a weak classifier that accurately classifies the local image features is selected, wherein after each selection of a weak classifier features that were misclassified by the selected weak classifier are given greater weight than features that were classified correctly by the selected weak classifier;
selecting individual weak classifiers for the plurality of weak classifiers by applying an allocation mask for each individual weak classifier to local image features so that entries associated with the local image features are allocated to bins, and applying one or more comparison functions to the bins;
performing for each selected weak classifier a hillclimbing algorithm to attempt to improve the weak classifier, wherein the hillclimbing algorithm includes performing iterative attempts at improvements to a selected weak classifier and accepting an iterative attempt at improvement if the iterative attempt results in an improvement in classification, and rejecting an iterative attempt at improvement if the iterative attempt does not lead to an improvement in classification, wherein the iterative attempts include a modification to a comparison function of a weak classifier; and
producing a strong classifier that is a weighted combination of the selected weak classifiers on which hillclimbing algorithms have been performed.

11. The method of claim 1, further comprising applying the strong classifier to a subsequent electronic image to infer a group of local images features in the electronic image that correspond to a picture, in discrimination to local image features that correspond to text.

12. The method of claim 1, further comprising removing local image features that have fewer than a threshold of adjacent inferred local image features within a predetermined distance, subsequent to the application of the strong classifier to the electronic image.

13. A computer-implemented classification system, comprising:
a classification trainer to:
receive local feature data for electronic images,
recursively apply weak classifiers to the local feature data,
compare determinations made by the weak classifiers to data describing the local feature data as being picture related or text related,
select, in each iteration of the recursive application of weak classifiers, a weak classifier that accurately determines that the local feature data is either picture related or text related,
perform a hillclimbing operation on the selected weak classifier, and
create one or more strong classifiers from the selected weak classifiers on which the hillclimbing operations were performed;
a classifying module to apply the strong classifier to subsequent electronic images to identify pictures, in discrimination to text, in the subsequent electronic images;

persistent electronic storage that stores data that represents local image features in the subsequent electronic images that are classified by the classifying module as identifying pictures in the subsequent electronic images; and one or more hyperlinks connecting a first image having local image features classified by the classifying module to a second image having local image features classified by the classifying module that are similar to the local image features for the first image.

14. The system of claim 13, wherein the creation of one or more strong classifiers includes selection of a group of the weak classifiers that includes the weak classifier from each iteration of the applying that most accurately determined if the local feature data was picture related or text related.

15. The system of claim 13, wherein, subsequent to each selection of a weak classifier, a subsequent round of the recursive applying is weighted so as to give features that were misclassified by the selected weak classifier greater weight than features that were classified correctly by the selected weak classifier.

16. A computer-implemented classification system, comprising:

a classification trainer to:
receive local feature data for electronic images,
recursively apply weak classifiers to the local feature data,
compare determinations made by the weak classifiers to data describing the local feature data as being picture related or text related,
select, in each iteration of the recursive application of weak classifiers, a weak classifier that accurately determines that the local feature data is either picture related or text related,
perform a hillclimbing operation on the selected weak classifier, and
create one or more strong classifiers from the selected weak classifiers on which the hillclimbing operations were performed;
a classifying module to apply the strong classifier to subsequent electronic images to identify pictures, in discrimination to text, in the subsequent electronic images; and
persistent electronic storage that stores data that represents local image features in the subsequent electronic images that are classified by the classifying module as identifying pictures in the subsequent electronic images;
wherein the classification trainer combines multiple strong classifiers into a meta-classifier, and wherein the classifying module applies the meta-classifier to the subsequent electronic images to identify pictures, in discrimination to text, in the subsequent electronic images.

17. The system of claim 16, wherein the application of the meta-classifier determines if features identified as picture-related by each strong classifier are proximate to features identified as picture-related by other of the strong classifiers in the meta-classifier to validate a portion of an image as picture related.

18. A computer-implemented method, comprising:
receiving local feature data for electronic images;
recursively applying weak classifiers to the local feature data;
comparing determinations made by the weak classifiers to data describing the local feature data as being picture related or text related;
selecting, in each iteration of the recursive application of weak classifiers, a weak classifier that accurately determines that the local feature data is either picture related or text related;
performing a hillclimbing operation on the selected weak classifier;
creating one or more strong classifiers from the selected weak classifiers on which the hillclimbing operations were performed;
applying the strong classifier to subsequent electronic images to identify pictures, in discrimination to text, in the subsequent electronic images;
storing data that represents local image features in the subsequent electronic images that have been classified as identifying pictures in the subsequent electronic images; and
connecting, with one or more hyperlinks, a first image having local image features to which the strong classifier has been applied to a second image to which the strong classifier has been applied and that are similar to the local image features for the first image.

19. A computer-implemented classification system, comprising:
receiving local feature data for electronic images;
recursively applying weak classifiers to the local feature data;
comparing determinations made by the weak classifiers to data describing the local feature data as being picture related or text related;
selecting, in each iteration of the recursive application of weak classifiers, a weak classifier that accurately determines that the local feature data is either picture related or text related;
performing a hillclimbing operation on the selected weak classifier;
creating one or more strong classifiers from the selected weak classifiers on which the hillclimbing operations were performed;
combining multiple strong classifiers into a meta-classifier;
applying the strong classifier to subsequent electronic images to identify pictures, in discrimination to text, in the subsequent electronic images;
applying the meta-classifier to the subsequent electronic images to identify pictures, in discrimination to text, in the subsequent electronic images; and
storing data that represents local image features in the subsequent electronic images that have been classified as identifying pictures in the subsequent electronic images.

* * * * *